United States Patent Office.

ALEXANDER WATT, OF LONDON, ENGLAND.

PROCESS OF ELECTROLYTICALLY OBTAINING ZINC.

SPECIFICATION forming part of Letters Patent No. 459,556, dated September 15, 1891.

Application filed March 22, 1889. Serial No. 304,346. (No specimens.) Patented in England March 5, 1888, No. 3,369.

*To all whom it may concern:*

Be it known that I, ALEXANDER WATT, of 81 Fernlea Road, Balham, London, in the county of Surrey, England, have invented certain new and useful Improvements in the Process of Electrolytically Obtaining Zinc, (for which I have obtained a patent in Great Britain, No. 3,369, dated March 5, 1888,) of which the following is a specification.

This invention relates to the treatment of zinc ores in preparation for the recovery of the zinc by electrolysis in a more commercially practicable and profitable manner than heretofore. In nearly all zinc ores lead is present in greater or less quantities, and it has a detrimental effect in the electrolytic treatment of zinc ores. The lead itself is a valuable product, and if it can be readily separated from the zinc, so as to become commer20 cially available, the process of extracting zinc from the ores by electrolysis will be rendered more profitable than heretofore and the zinc will be obtained in a state of greater purity. The zinc ores to be treated are tested by as25 say to ascertain the percentage of lead they contain, which may be found to vary from one to ten per cent. or more.

For the purposes of my invention ores containing different percentages of lead may be mixed in order to make the working of the process more profitable. The ore is picked, finely ground, and sifted in the usual way, and is then ready for treatment. The powdered ore is first digested in a bath of acetic acid (being agitated from time to time) to bring all the fine particles into contact with the acid. Both lead and zinc (carbonates and oxides) are freely soluble in acetic acid, and I thus obtain a neutral acetate solution con40 taining zinc and lead, which I run off to a suitable vessel to be purified or freed from the lead. This is effected by introducing into the vessel scrap zinc or clippings or sheets of zinc, which, as is well known, will reduce the lead present in the solution to a metallic state. In this state the lead will fall to the bottom of the vessel, when it may be collected and melted in the ordinary way. The scrap or other zinc thus employed takes the place of the lead thrown down and a solution of acetate of zinc remains, from which the zinc is recovered, as will be described hereinafter. After the acetate solution has been run off from the ore the latter is washed with water to remove the remaining acetate, and the ore is then treated with dilute sulphuric acid to dissolve out the zinc carbonate or oxide, as the case may be, remaining in the ore. The sulphate-of-zinc solution thus formed is then mixed in a suitable depositing-tank with the acetate solution, and the blended liquors form the electrolyte or bath from which the zinc is afterward extracted or reduced by electrolysis. The mixed solution of acetate and sulphate should be nearly neutral, (a slight excess of acid is not objectionable,) which may be readily ascertained by means of litmus paper. The acetic acid I find it convenient to use is what is known as "commercial acetic acid," containing about fifteen per cent. of real acid, though a stronger or weaker acid may be used, and the sulphuric acid (which may be ordinary oil of vitrol) I dilute with water to the extent of about seven parts of water to one of acid. The solutions I mix in the proportions of from one-fourth to onethird of acetate solution to two-thirds or threefourths of sulphate solution, and the mixed solution thus obtained is diluted with water until the diluted solution attains a specific gravity of, say, 1,100°, (water being 1,000°.) The insoluble residues resulting from the acid treatment of the ore are washed with water to get out the remaining zinc solution, and the washing-water may be used to dilute the mixed solutions above mentioned.

The tanks or vessels used should be of large size and should not be filled up with solution, as the addition of the powdered ore occasions the liberation of carbonic acid, which causes the solution to froth up, and unless the tanks are large enough the contents might overflow. For the same reason the ore should be added to the acid gradually and in small quantities at a time. The quantity of ore introduced into a given quantity of the acid will be such as to produce a neutral or nearly neutral solution, and can be previously estimated approximately by calculation. If the ore is comparatively free from lead—that is to say, contains only about one-half per cent. or so of lead, as in some samples of calamine or native carbonate of zinc—the powdered ore may be treated at once with a mixed solution of commercial acetic acid and dilute sulphuric acid, in the proportions of one part acetic acid to two parts of the dilute sulphuric acid, to obtain a mixed solution of acetate and sulphate of zinc as the electrolyte for the recovery of the zinc therefrom by electrolysis. The small percentage of lead in this case will have practically no effect on the electrolytic treatment. "Flue-dust" or impure oxide of zinc may also be treated by my process, whether lead be present or not, the object in all cases being to obtain an electrolyte from which zinc of great purity can be obtained.

When treating "blende" or native sulphide of zinc, the ore will first be roasted to expel the sulphur in the usual way and then be reduced to a fine powder.

The use of the mixed solutions of acetate and sulphate of zinc, as above described, gives better results than can be obtained with either one alone, as the deposits of zinc are less liable to form "trees" and other objectionable irregularities.

Having now described and ascertained the nature of the said invention, what I claim is—

1. The improvement in the art of preparing zinc-bearing ores for electrolysis, which consists in digesting the powdered ore in acetic and sulphuric acids, as set forth, to form an electrolyte, substantially as described.

2. The improvement in the art of preparing zinc-bearing ores for electrolysis, which consists in digesting the powdered ore in acetic acid and sulphuric acid, at first separately and afterward jointly, as set forth, to form an electrolyte, substantially as described.

3. The improved electrolyte herein described, composed of a mixture of acetate and sulphate solutions of zinc, substantially as described.

ALEXANDER WATT.

Witnesses:
H. K. WHITE.
A. W. SPACKMAN.